United States Patent [19]

Sghibartz

[11] 4,426,464

[45] Jan. 17, 1984

[54] MARINE PAINT

[75] Inventor: Cristian M. Sghibartz, Washington, England

[73] Assignee: International Paint Public Limited Company, London, England

[21] Appl. No.: 393,486

[22] Filed: Jun. 29, 1982

[30] Foreign Application Priority Data

Jul. 3, 1981 [GB] United Kingdom ............... 8120569

[51] Int. Cl.³ ........................................... C08L 33/02
[52] U.S. Cl. ................................. 523/122; 106/15.05; 524/197; 524/202; 524/413; 524/432
[58] Field of Search ................ 523/122; 524/413; 106/15.05; 524/197, 202, 432

[56] References Cited

U.S. PATENT DOCUMENTS

| | | | |
|---|---|---|---|
| 4,021,392 | 5/1977 | Milne et al. | 260/28.5 A |
| 4,139,515 | 2/1977 | Dennington | 260/29.6 MM |
| 4,191,579 | 3/1980 | Hails et al. | 106/15 R |

FOREIGN PATENT DOCUMENTS 1324296  7/1973  United Kingdom .

OTHER PUBLICATIONS

"Chemically Anchoring Mildewcides to Model Paint Binders" by G. A. Stahl and C. U. Pittman, *Coatings And Plastic Preprints*, American Chemical Society, vol. 37, No. 1, p. 355 (1977).

*Primary Examiner*—Lorenzo B. Hayes
*Attorney, Agent, or Firm*—Steele, Gould & Fried

[57] ABSTRACT

A marine paint capable of becoming smoother in relatively moving sea-water comprises a film-forming copolymer and a metalliferous pigment which is sparingly soluble in sea-water. The copolymer comprises 20-80 percent by weight of units of a quinolinyl or substituted quinolinyl ester of an olefinically unsaturated carboxylic acid with the balance of the copolymer being units of at least one olefinically unsaturated comonomer or comprises 10 to 80 percent by weight of (a) units of a quinolinyl or substituted quinolinyl ester of an olefinically unsaturated carboxylic acid, up to 60 percent by weight of (b) units of a triorgano tin salt of an olefinically unsaturated carboxylic acid, with (a) and (b) together forming 20 to 80 percent by weight of the copolymer, and the balance of the copolymer being units of at least one olefinically unsaturated comonomer.

8 Claims, No Drawings

MARINE PAINT

This invention relates to marine anti-fouling paints generally used as top-coat paints for ships' hulls.

The growth of marine organisms on the sub-marine parts of a ship's hull increases the frictional resistance of the hull to passage through water, leading to increased fuel consumption and/or a reduction in the speed of the ship. Marine growths accumulate so rapidly that the remedy of cleaning and repainting as required is impractical. In general, the extent of fouling is limited by applying to the hull a top-coat incorporating anti-fouling agents. The anti-fouling agents are biocides which are freed from the surface of the paint over a period in concentrations lethal to marine organisms on the hull's surface. The anti-fouling paint fails only when the concentration of biocide available at the paint surface falls below the lethal concentrations, and with marine paints up to two years of useful life can be expected. The better anti-fouling paints are thus effective in dealing with gross infestation of hulls for considerable periods but a top-coat paint of a ship's sub-marine surface has irregularities from its method of application and is furthermore subject to breakdown and delamination during service, increasing the roughness of the hull so that the performance of the ship falls off even when fouling is prevented.

According to the present invention, a marine paint comprises a film-forming copolymer which is a copolymer containing 20 to 80 percent by weight of units of a quinolinyl or substituted quinolinyl ester of an olefinically unsaturated carboxylic acid, the balance of the copolymer being units of at least one olefinically unsaturated comonomer, and a metalliferous pigment which is sparingly soluble in sea-water.

The paint of the present invention has the remarkable property that relatively moving sea-water smooths the surface of the paint, removing excrescences composed of the paint. When it is painted on a ship, the painted sub-marine surface of the ship at least preserves its initial smoothness and may become smoother during the ordinary traffic of the ship, leading to improved efficiency. Our British patent specification No. 1,457,590 describes and claims a paint having this remarkable property and FIGS. 2A-2D in particular of the drawings accompanying British patent specification No. 1,457,590 illustrate the smoothing effect of the relatively moving sea-water. A similar smoothing effect is achieved with the paint of the present invention. The paint described and claimed in British patent specification No. 1,457,590 is based on a film-forming copolymer containing units of a triorgano tin salt of an olefinically unsaturated carboxylic acid. Upon contact with sea-water it loses triorgano tin ions by ion exchange with sea-water. This generates a water-soluble resin which essentially is a copolymer salt formed as a result of the depletion in the copolymer organotin content and exchange with metal ions present in sea-water. The smoothing of paint described in British patent specfication No. 1,457,590 is thus inevitably accompanied by the release of organotin ions into the surrounding sea-water. In most circumstances this is useful, because the triorgano tin ions are effective anti-fouling agents. However, triorgano tin ions are expensive to employ and are strongly biocidal and there are some circumstances where the release of triorgano tin ions is preferably avoided or reduced whilst still obtaining the benefits of smoothing of the paint in service. The present invention provides a self-smoothing paint which does not release such strongly biocidal ions.

The paint of the present invention generates a water-soluble residue by exchange of quinolinyl (or substituted quinolinyl) groups in the polymer for metal ions present in the sea-water. The quinolinyl groups are released into the sea-water. These are generally not toxic to animal life, although they have some effect in inhibiting fouling by algae and seaweed. Generally, the metalliferous pigment is chosen to have biocidal activity or a separate anti-fouling agent is used in paints according to the invention. This can be chosen for the particular waters which a ship is likely to encounter.

If desired, the film-forming copolymer can also contain units of a triorgano tin salt of an olefinically unsaturated carboxylic acid and these units can replace a part of the units of the quinolinyl (or substituted quinolinyl) ester.

The invention therefore also provides a marine paint which comprises a film-forming copolymer and a metalliferous pigment which is sparingly soluble in sea-water, and in which the copolymer comprises 10-80 percent by weight of (a) units of a quinolinyl or substituted quinolinyl ester of an olefinically unsaturated carboxylic acid, up to 60 percent by weight of (b) units of a triorgano tin salt of an olefinically unsaturated carboxylic acid (a) and (b) together forming 20-80 percent by weight of the copolymer, and the balance of the copolymer being (c) units of at least one olefinically unsaturated comonomer.

The quinolinyl or substituted quinolinyl ester of an olefinically unsaturated carboxylic acid preferably has the formula $CHR'=CR-COO-Q$ (I) where R is a hydrogen atom or methyl group, R' is hydrogen or -COOQ and Q is a 8-quinolinyl group optionally substituted by one or more alkyl or alkoxy groups having 1 to 4 carbon atoms, halogen atoms, nitro, cyano or substituted acid amide groups. Compounds of formula (I) can be made by reaction of the corresponding 8-hydroxy quinoline with acrylyl or methacrylyl chloride. The ester (I) is preferably unsubstituted quinolinyl acrylate or methacrylate; halogenated derivatives such as 7-bromo-5-chloro-quinolinyl-8 acrylate are an alternative.

The olefinically unsaturated comonomer can be an acrylic monomer, for example methyl methacrylate, methyl acrylate, ethyl acrylate, propyl acrylate, butyl acrylate, amyl acrylate, hexyl acrylate, the corresponding esters of methacrylic acid, acrylonitrile or methacrylonitrile, or a vinyl monomer, for example vinyl acetate, vinyl butyrate, vinyl chloride, styrene or vinyl pyridine. The polymer can also contain monomer units conferring increased water-reactivity, particularly when the polymer contains a relatively low proportion of monomer units (a) or monomer units (a) and (b). For example, the polymer can contain up to 20 percent by weight of maleic or itaconic anhydride, acrylamide, methacrylamide or N-vinyl pyrrolidone units or up to 5 percent by weight, preferably 2 percent or less, of acrylic, methacrylic or itaconic acid units. Care must be taken to avoid gelation of the paint when using a copolymer containing free acid monomer units.

The monomer units (b) are preferably of the formula $R_3SnOOCCR'=CHR''$ where each R is an alkyl radical containing 2 to 8 carbon atoms or an aryl or aralkyl radical, R' is H or $CH_3$ and R'' is H or $-COOSnR_3$. The groups R attached to the tin atom can be different but are preferably the same, for example $R_3Sn$ can be tributyl tin, tripropyl tin, tribenzyl tin, triphenyl tin, tritolyl tin or trihexyl tin. The carboxylate group -OOCCR'=CHR" is preferably acrylate, methacrylate or meleate.

If triorgano tin salt units are not present the film-forming copolymer preferably comprises 20–60 percent by weight of the quinolinyl (or substituted quinolinyl) ester units and 40–80 percent by weight of units of the comonomer, for example at least one alkyl acrylate or methacrylate. If triorgano tin salt units are present the copolymer preferably comprises 15–40 percent by weight of the quinolinyl (or substituted quinolinyl) ester units (a), 20–45 percent by weight of the triorgano tin salt units (b), for example tributyl tin methacrylate units, and 30–50 percent by weight of units of at least one alkyl acrylate or methacrylate.

The film-forming copolymers can be prepared by free radical polymerisation under polymerisation conditions, generally using a catalyst such as benzoyl peroxide or azobisisobutyronitrile in an organic solvent such as xylene, toluene, butyl acetate, 2-ethoxyethanol, 2-methoxyethanol, 2-ethoxyethyl acetate, methyl isobutyl ketone, butanol and/or cyclohexanone or in aqueous emulsion. For solvent polymerisation mixtures of xylene with minor amounts, for example up to 20 percent by volume, of 2-ethoxyethanol, 2-ethoxyethyl acetate or methyl isobutyl ketone may be preferred. Polymerisation is preferably carried out at a temperature in the range 70°–100° C.

The metalliferous pigment sparingly soluble in sea-water may alternatively be described as a substantially water-insoluble metalliferous pigment capable of reacting with sea-water. It is exemplified by cuprous thiocyanate, cuprous oxide, zinc oxide, zinc chromate, cupric acetate metaarsenate, and zinc ethylene bis(dithiocarbamate). These pigments produce water-soluble metal compounds on reaction with sea-water so that the pigment particles do not survive at the paint surface. Preferably, the sparingly soluble pigment has a solubility in sea-water of from about 1 to about 10 parts per million by weight. The pigment has the effect of inducing the overall smoothing which the relatively moving sea-water exerts on the paint film, minimising localised erosion and preferentially removing excrescences formed during application of the paint. Mixtures of such pigments can be used, for example zinc oxide, which is most effective at inducing the gradual dissolution of the paint, can be mixed with cuprous oxide, cuprous thiocyanate or zinc ethylene bis(dithiocarbamate), which are more effective marine biocides. The ratio of zinc oxide to cuprous oxide or thiocyanate can for example be 1:1 to 9:1 by weight.

The paint composition can additionally contain a pigment which is highly insoluble in sea-water (solubility below 1 ppm by weight), such as titanium dioxide or ferric oxide. Such highly insoluble pigments can be used in proportions up to 40 percent by weight of the total pigment component of the paint, but preferably are used in proportions of less than 20 percent by weight. The highly insoluble pigment has the effect of retarding the dissolution of the paint.

The proportion of pigment to copolymer is preferably such as to give a pigment volume concentration which is above 25 percent in the dry paint film but below the critical pigment volume concentration; most preferably the pigment volume concentration is 35–50 percent.

Polymers containing the quinolinyl (or substituted quinolinyl) ester may be somewhat brittle, particularly those containing a high proportion of a quinolinyl methacrylate. The paints according to the invention may therefore include a plasticiser, for example tritolyl phosphate, diisooctyl phthalate, tributyl phosphate, butyl benzyl phthalate, 'Lutenal A25' polyether or dibutyl tartrate. Alternatively, the olefinically unsaturated comonomer can be chosen to reduce the brittleness of the copolymer. Examples of comonomers which reduce brittleness are alkyl acrylates containing three or more carbon atoms in the alkyl group, for example butyl acrylate, hexyl acrylate or 2-ethylhexyl acrylate.

If the rate of dissolution in relatively moving sea-water of a combination of the polymer containing quinolinyl (or substituted quinolinyl) ester units and a pigment sparingly soluble in sea-water is undesirably rapid, for example when the polymer contains a relatively high proportion of quinolinyl (or substituted quinolinyl) ester and triogano tin salt units, the rate of dissolution can be retarded by including in the paint a hydrophobic organic compound which retards the dissolution of the paint. Examples of such hydrophobic organic retarders are methyl phenyl silicone fluids, for example silicone fluid DC550 sold by Dow Corning Ltd., chlorinated diphenyl, for example Aroclor 1254 sold by Monsanto Ltd., chlorinated paraffin wax, for example Cereclor 48 and Cereclor 70 sold by I.C.I. Ltd., diphenyl ether, dichlorodiphenyltrichloroethane and low molecular weight polybutenes, for example Hyvis 05 sold by B.P. Ltd. The hydrophobic organic retarder, for example chlorinated diphenyl or chlorinated paraffin wax, may also be a plasticiser for the paint.

Many of the sparingly sea-water soluble metalliferous pigments have some biocidal activity, particularly zinc ethylene bis(dithiocarbamate) and copper compounds such as cuprous thiocyanate, cupric acetate metaarsenate and cuprous oxide but also zinc oxide to a lesser extent. Even when the copolymer contains no triorgano tin salt units (b), the biocidal effect of the sparingly sea-water-soluble pigments, particularly zinc ethylene bis(dithiocarbamate) and cuprous oxide, may be sufficient so that the paint needs no further biocide, for example in the case of paint for use on the flat bottom of very large tankers, where fouling is less likely to occur. We believe that the self-smoothing action of the paint increases its resistance to fouling compared to a conventional paint releasing biocide at the same rate. This effect is more marked with increasing rate of dissolution of the paint.

The paint can contain an added biocide effective against seaweed and barnacles. Triorgano tin salts and oxides such as triphenyltin fluoride, tributyl tin fluoride, tributyl tin dibromosuccinate, triphenyltin chloride, triphenyltin hydroxide and tributyltin oxide are effective marine biocides and can be used in paints according to the invention, particularly where the polymer contains no monomer units (b). A paint according to the invention comprising a tin-free polymer, a pigment such as cuprous oxide and a small proportion of a triorgano tin salt (up to 25 percent by volume based on the pigment) may have antifouling and smoothing properties equal to an organo tin copolymer paint of much higher total organo tin content. Alternatively a mixture of organo tin-free and organo tin-containing polymers can be used.

In some cases it will be desired to avoid completely the release of triorgano tin ions. Examples of other biocides effective as antifouling agents are dithiocarbamate derivatives such as cuprous ethylene bis(dithiocarbamate) or 2-(N,N-dimethyl thiocarbamyl thio)-5-nitro thiazole, substituted isothiazolones particularly halogenated N-substituted isothiazolones, tetramethyl thiuram disulphide and dichlorodiphenyltrichloroethane (which also acts as a hydrophobic organic retarder).

The invention is illustrated by the following Examples:

EXAMPLE 1

Preparation of 8-Quinolinyl Acrylate

8-Hydroxyquinoline (58.0 g: 0.40 mole) was dissolved in a mixture of toluene (500 ml) and triethylamine (41.4 g; 0.41 mole). Acrylyl chloride (38.0 g; 0.42 mole) was added slowly, while stirring, the reaction temperature beting kept under 30° C. When the addition was complete the mixture was stirred for another 1 hour. The solution was then filtered and washed with a solution of sodium hydrogen carbonate in water followed by water only, and finally the toluene layer was dried with anhydrous sodium sulphate. Some toluene was evaporated off using a rotary evaporator under low pressure. The solution was left in a refrigerator overnight and the solid formed was filtered off. This was identified by infra-red and N.M.R. spectroscopy and microanalysis to be 8-quinolinyl acrylate. Yield 48.6 g (61 percent of the theoretical yield).

It was recrystallised from toluene to give crystals with m.p.: 50°-52° C.

COPOLYMERISATION

8-Quinolinyl acrylate (12.3 g; 0.054 mole) was dissolved in cyclohexanone (63 g). Butyl acrylate (28.7 g; 0.224 mole) was added, followed by azobisisobutyronitrile (1.0 g). The solution was heated to 75° C. and the polymerisation reaction was conducted with stirring at this temperature. A mild exotherm was observed in the first 15 minutes of the reaction. The course of the polymerisation was followed by observing the change in the refractive index. No further change was observed after 5 hours and the solution was heated to 100° C. for a period of 30 minutes to destroy any residual activity of the azobisisobutyronitrile. The product was a solution of a 30:70 by weight copolymer of 8-quinolinyl acrylate and butyl acrylate.

PAINT PREPARATION 64.3 g of the quinolinyl acrylate butyl acrylate copolymer solution was diluted with 20.3 g cyclohexanone to give 84.6 g of a 29.5 percent by weight solution. This was mixed with zinc oxide (67.5 g) and Aerosil colloidal silica (1.3 g) and milled overnight.

The paint obtained had a pigment volume concentration of 35 percent and a solids content of 37 percent by volume.

EXAMPLE 2

COPOLYMERISATION

8-Quinolinyl acrylate prepared as described in Example 1 (16.4 g; 0.072 mole) was dissolved in cyclohexanone (63 g). Butyl acrylate (24.6 g; 0.192 mole) was added, followed by azobisisobutyronitrile (1.0 g). The solution was heated to 75° C. and the polymerisation reaction was conducted as described in Example 1. The product was a solution of a 40:60 by weight copolymer of 8-quinolinyl acrylate and butyl acrylate.

PAINT PREPARATION 66.7 g of the quinolinyl acrylate butyl acrylate copolymer solution was diluted with 18.7 g cyclohexanone to give 85.4 g of a 30.1 percent by weight solution. This was mixed with zinc oxide (67.5 g) and Aerosil colloidal silica (1.3 g) and milled overnight.

The paint obtained had a pigment volume concentration of 35 percent and a solids content of 37 percent by volume.

The smoothing performance of paints in relatively moving sea-water can be tested in the apparatus described in British patent specification No. 1,457,590 with reference to FIGS. 7A and 7B. A mild steel disc 31 having a diameter of 23 cm is coated overall with a conventional anti-corrosive paint and overcoated in radial stripes with the paints under test. The stripes are applied by a standardised applicator adapted to deposit a film 20$\mu$ thick (wet thickness).

The disc is immersed in flowing sea-water and rotated at a peripheral speed of 33 knots.

During this test the paint films under test are planed away, eventually to the extent that the underlying substrate (the anti-corrosive paint) is revealed. There is always some variation in the thickness of the paint film within each stripe so that the stripe of paint does not suddenly vanish; an increasing proportion of the substrate is revealed over time. When the substrate is revealed over 50 percent of the area of the stripe it is a good approximation to say that the paint film in the stripe has lost by planing the original average dry thickness of the paint film in the stripe. The time in days to achieve this ("$D^{50}$") is a measure of the rate of planing of the paint in relatively moving sea-water.

The surface of the paint film in each stripe should be examined during the test to note whether it is smooth and firm. Paint films according to the invention which at least retain their initial smoothness must be distinguished from paint films which are removed over at least a portion of the stripe by flaking or localised erosion causing roughening or by separation from the disc.

The above test can be used to give an absolute rate of planing of the paint film, but the temperature, composition and flow rate of the sea-water can affect the result. The test is preferably used as a comparison in which one of the stripes painted on the disc is an anti-fouling paint known to have the desired rate of dissolution in relatively moving sea-water. The paint described in Example 1 of British patent specification No. 1,457,590, using copolymer C and 30 percent by weight dichlorodiphenyl trichloroethane based on the organo tin content of the copolymer, is a paint which has been found to be successful in use on ships in service and can be used as a reference stripe in tests.

A disc was prepared having 2 stripes each of the paints of Examples 1 and 2, and 2 stripes of the above described paint of Example 1 of British patent specification No. 1,457,590.

All the paints were observed to be planed away during rotation in sea-water. The stripes of paint according to Example 1 of British patent specification No. 1,457,590 both had a $D^{50}$ of 12 days. The stripes of the paint of Example 1 of the present application had a $D^{50}$ of 15 and 16 days and the stripes of the paint of Example 2 both had a $D^{50}$ of 16 days. The results indicate a rate of dissolution in relatively moving sea-water which would be sufficient to give appreciable smoothing of the paint film without its being dissolved away too fast and compatible with the release of sufficient of an added biocide without forming a leached inactive outer layer of paint.

EXAMPLE 3

48.9 g of the copolymer solution prepared in the copolymerisation stage of Example 1 was mixed with 20.9 g zinc oxide, 22.2 g cuprous oxide, 0.8 g Aerosil, 1.5 g bentonite, 0.5 g n-butanol and 8.0 g cyclohexanone and milled overnight to produce a paint of pigment volume concentration 35 percent and solids content 38 percent by volume.

The paints of Examples 1 and 3 were both applied to a test panel. The panels were fixed to the bilge keel of a ferry operating in the Mediterranean. The panels were examined after 14 months in service, including 2 months in which the ferry was laid up in the Mediterranean. Areas around the test panels which were not coated with antifouling paint showed very heavy weed and animal fouling.

The paint of Example 1 which contained no biocide apart from zinc oxide and the copolymer, showed no fouling by seaweed and no adherent algal slime, although there was some fouling by tube worms. (Tube worms are known to be susceptible to many marine biocides such as cuprous oxide, zinc ethylene bis(dithiocarbamate) or triphenyl tin fluoride and a small amount of one of these could be added to the paint to boost its resistance to animal fouling.) The paint of Example 1 was smoothed away from the panel at 5 microns per month which is about the ideal rate to obtain a decrease in roughness of the paint film without using up the paint too fast; the commercially successful self-polishing organo tin copolymer paint used on the hull of the ship was smoothed away at 6 microns per month.

The paint of Example 3 showed no weed or animal fouling and only a little algal slime. This paint was smoothed away at 1 to 2 microns per month; this may be rather slow to obtain any significant decrease in roughness.

EXAMPLE 4

8-quinolinyl acrylate (12.3 g) and methyl methacrylate (28.7 g) were copolymerised under the conditions described in Example 1 to prepare a 39 percent by weight solution of a 30:70 by weight copolymer of 8-quinolinyl acrylate and methyl methacrylate. 48.9 g of the copolymer solution was milled with 41.1 g zinc oxide, 0.8 g Aerosil, 1.5 g bentonite, 0.5 g n-butanol and 8.0 g cyclohexanone to produce a paint of pigment volume concentration 35 percent and solids content 38 percent by volume.

EXAMPLE 5

14.35 g 8-quinolinyl methacrylate and 26.65 g methyl methacrylate were copolymerised under the conditions described in Example 1 to prepare a 39 percent by weight solution of a 35:65 by weight copolymer of 8-quinolinyl methacrylate and methyl methacrylate. A paint was prepared using the formulation of Example 4 except that 18 percent of the copolymer was replaced with an aqual volume of tritolyl phosphate plasticiser.

EXAMPLE 6

18.45 g 8-quinolinyl methacrylate was copolymerised with 22.55 g methyl methacrylate using the conditions described in Example 1 to produce a 39 percent by weight solution of a 45:55 by weight copolymer of 8-quinolinyl methacrylate and methyl methacrylate. A paint was prepared from the copolymer solution using the procedure of Example 5, including the plasticising by tritolyl phosphate.

EXAMPLE 7

24.6 g 7-bromo-5-chloro-quinolinyl-8 acrylate was copolymerised with 16.4 g methyl methacrylate using the conditions of Example 1 to produce a 39 percent by weight solution of a 60:40 by weight copolymer of 7-bromo-5-chloro-quinolinyl-8 acrylate and methyl methacrylate. A paint was prepared from the copolymer solution using the procedure of Example 4.

The smoothing performance of the paints of Examples 4 to 7 was tested using the test apparatus described in British patent specification No. 1,457,590 with reference to FIGS. 7A and 7B. The paints of Examples 4 to 7 were tested by comparison with a commercially successful organo tin copolymer paint. The results obtained were as follows:

| | Average $D^{50}$ (Individual readings) |
|---|---|
| Paint of Example 4 | 35 days (31, 39) |
| Paint of Example 5 | 20 days (only one stripe applied) |
| Paint of Example 6 | 14 days (only one stripe applied) |
| Paint of Example 7 | 13.5 days (14, 13) |
| Commercial paint for comparison | 18 days (16, 18, 20, 17, 17) |

The paints of Examples 4 to 7 all had a rate of dissolution similar to that of the commercial paint which has been successfully used in service, indicating that these paints would give appreciable smoothing of the paint film in service without its being dissolved away too fast.

What is claimed is:

1. A marine paint comprising a film-forming copolymer which is a copolymer containing 20 to 80 percent by weight of units of a quinolinyl or substituted quinolinyl ester of an olefinically unsaturated carboxylic acid, the balance of the copolymer being units of at least one olefinically unsaturated comonomer, and a metalliferous pigment which is sparingly soluble in sea-water.

2. A marine paint according to claim 1 in which the copolymer comprises 20 to 60 percent by weight of the quinolinyl ester units.

3. A marine paint comprising a film-forming copolymer and a metalliferous pigment which is sparingly soluble in sea-water, in which the copolymer comprises 10 to 80 percent by weight of (a) units of a quinolinyl or substituted quinolinyl ester of an olefinically unsaturated carboxylic acid, up to 60 percent by weight of (b) units of a triorgano tin salt of an olefinically unsaturated carboxylic acid, (a) and (b) together forming 20 to 80 percent by weight of the copolymer, and the balance of the copolymer being units of at least one olefinically unsaturated comonomer.

4. A marine paint according to claim 1 or claim 3 in which the quinolinyl ester units are 8-quinolinyl acrylate units.

5. A marine paint according to claim 1 or claim 3 in which the quinolinyl ester units are 8-quinolinyl methacrylate units.

6. A marine paint according to claim 1 or claim 3 in which the comonomer is an alkyl acrylate or methacrylate ester.

7. A marine paint according to claim 1 or claim 3 in which the metalliferous pigment is a mixture of zinc oxide with cuprous oxide, cuprous thiocyanate or zinc ethylene bis(dithiocarbamate).

8. A marine paint according to claim 1 or claim 3 in which the metalliferous pigment is a mixture of zinc oxide with cuprous oxide or cuprous thiocyanate in a ratio of 1:1 to 9:1 by weight.

* * * * *